Figure 1:
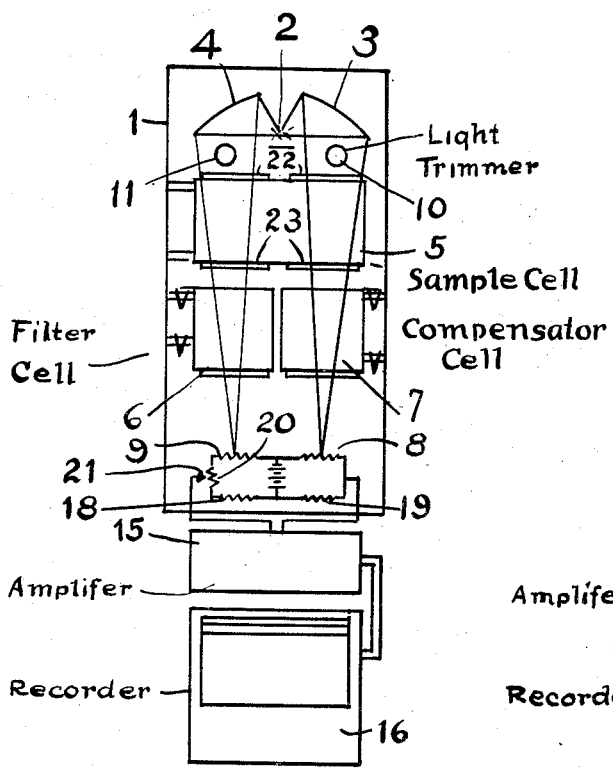

Dec. 21, 1954      C. W. SKARSTROM      2,697,789
APPARATUS AND PROCEDURE FOR CONTINUOUS GAS ANALYSIS
Filed June 5, 1948      7 Sheets-Sheet 1

Charles W. Skarstrom Inventor
By W. O. T Heilman  Attorney

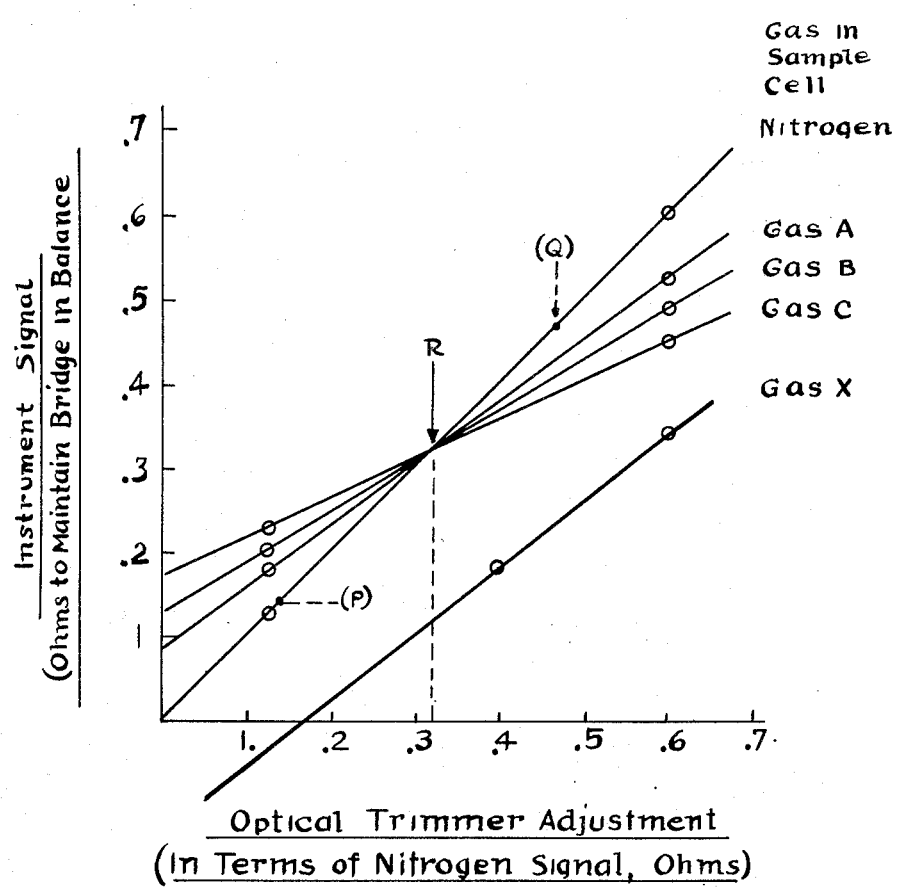
FIG.—6

Dec. 21, 1954   C. W. SKARSTROM   2,697,789
APPARATUS AND PROCEDURE FOR CONTINUOUS GAS ANALYSIS
Filed June 5, 1948   7 Sheets-Sheet 6

Charles W. Skarstrom Inventor
By W. O. ?????  Attorney

Dec. 21, 1954   C. W. SKARSTROM   2,697,789
APPARATUS AND PROCEDURE FOR CONTINUOUS GAS ANALYSIS
Filed June 5, 1948   7 Sheets-Sheet 7

Charles W. Skarstrom Inventor
By W. I. Hilman Attorney

United States Patent Office

2,697,789
Patented Dec. 21, 1954

2,697,789

APPARATUS AND PROCEDURE FOR CONTINUOUS GAS ANALYSIS

Charles W. Skarstrom, Pearl River, N. Y., assignor to Standard Oil Development Company, a corporation of Delaware Application June 5, 1948, Serial No. 31,346

5 Claims. (Cl. 250—43.5)

The present invention relates to a novel apparatus and an improved procedure for continuously analyzing gaseous compositions. In particular, the invention relates to the use of a dual beam type of infrared gas analyser of novel construction and a novel process for using this analyzer enabling the analysis of a particular constituent of a multi-constituent gas sample. In many cases the novel analytical process may also be advantageously employed with conventional analyzers.

At the present time, in chemical and petroleum operations, it is becoming increasingly prevalent to conduct operations as continuous processes rather than as batch processes. The advantages of continuous processes over batch processes are well known. One of the most difficult problems involved in adapting certain batch processes to continuous operation is the difficulty of suitably controlling the processes. In certain operations, streams of reactants are brought together in a reaction chamber under critical reaction conditions and the reaction products are withdrawn at high rates of fluid flow. In such processes it is generally extremely important, or essential, for efficient operation to have means for closely following and controlling the continuous process and it is frequently necessary to know both the composition of the reactants and of the reaction products. Ordinarily it is simple enough to determine the composition of the reactants as this may be done at any time prior to introduction to the reaction chamber. However, a more difficult problem is generally encountered in determining the composition of the reaction products. Clearly reaction products flowing from a reaction chamber at high velocities cannot be subjected to long and difficult analytical procedures if the operation of the process depends upon an immediate and continuous knowledge of their composition. Consequently, the need is greatly felt at the present time for analytical procedures which may be conducted in an extremely short period of time. At the same time, there exists a need for rapid analytical procedures which may be conducted and recorded continuously. It is therefore the principal purpose of this invention to provide apparatus and procedure of this character suitable for rapidly and continuously analyzing a single gas in a mixture. The gas being analyzed, hereafter referred to as the "key component," serves as an index of the efficiency of operation of the process from which the gas is derived. If it is desired to analyze for more than one key component, several instruments may be used, each one being used to detect one key component.

It has long been appreciated that a possible means for attaining the objectives of this invention is to subject gas streams to a beam of suitable radiation enabling the determination of the composition of the stream by the nature of the radiation absorbed or transmitted. For example, gas analyzers are known to the art which pass a beam of infrared radiation through a gas sample. With particular gas constituents in the stream it is possible to learn the composition of the stream by determining how opaque the gas stream is. Thus, if a gas stream consists only of the gases nitrogen and carbon dioxide, by means known to the art, it is relatively simple to subject the stream to the infrared analysis procedure referred to in order to determine the percentage of carbon dioxide present. This procedure is simple by virtue of the fact that nitrogen is transparent to infrared radiation so that the opacity of the gas stream will be purely a function of the amount of carbon dioxide present. In attempting to extend this analytical method to more complicated gas streams, difficulties are encountered however. For example, if the gas stream contains several constituents which are opaque to infrared radiation, it is extremely difficult to distinguish between these constituents by this general method. It is therefore a further object of this invention to provide an infrared gas analysis procedure suitable for analyzing and distinguishing one key component in a complicated gas stream containing several constitutents opaque to infrared radiation.

Figure 2:
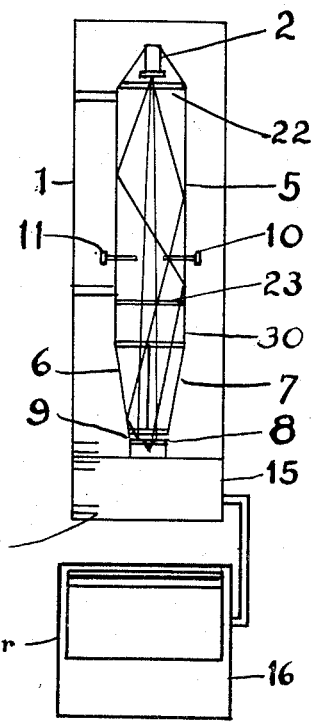
Figure 3:
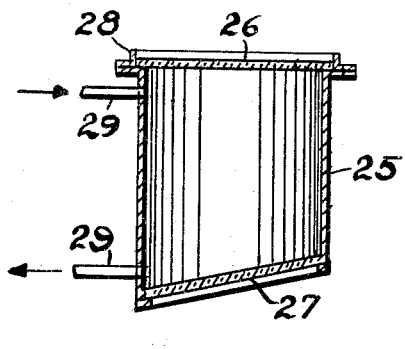
Figure 4:
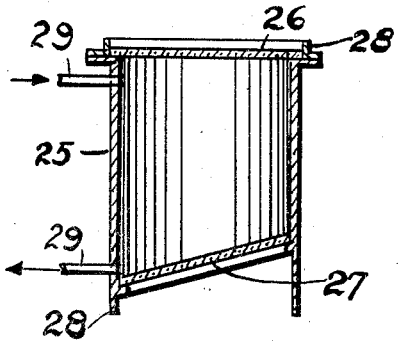

In order to clearly understand this invention, it is necessary first to appreciate the apparatus to be employed and secondly, to appreciate the analytical procedure which must be used. The apparatus is illustrated in Figures 1, 2, 3, and 4 of the accompanying drawings. Figure 1 represents a diagrammatical view of one type of infrared gas analyzer which may be used, while Figure 2 diagrammatically illustrates a second type of analyzer which may be used. Figures 3 and 4 show the novel sample cells of this invention which are preferably employed in the apparatus of Figures 1 and 2.

Referring now to Figure 1, it will be noted that the analyzer comprises a housing 1 in which the optical equipment and gas cells are placed. A light source 2 capable of emitting infrared radiation is placed at one end of the analyzer. To each side and behind the light source are placed concave mirrors 3 and 4 which serve to direct the light from source 2 along the paths indicated. Light from the mirrors 3 and 4 is transmitted along separate paths through a sample cell 5 and then through either a filter cell 6 or a compensator cell 7 onto resistance thermometers 8 and 9. The apparatus is so arranged that both beams of light pass through the sample cell 5 while only one of the beams of light pass through the filter cell 6 and compensator cell 7. The cells are each provided with openings to permit introduction and withdrawal of fluids. "Trimmers" 10 and 11 are provided in the light paths adjacent to the mirrors. These trimmers are adapted to change the amount of radiation passing them and reaching the sample cell. The trimmers, for example, may be opaque plates constructed so as to permit screwing them into or out of the path of the light so as to permit more or less radiation to pass and to reach the thermometers 8 and 9. The electrical circuit to which the resistance thermometers 8 and 9 are connected will be more fully described below.

The analyzer shown in Figure 2 is substantially the same as that shown in Figure 1 except that a somewhat different optical system is used. In the apparatus of Figure 2 the light source 2 is not backed by mirrors but radiation reaching the sample cell 5 is emitted directly from the light source. The sample cell 5 is provided with reflecting surfaces such as gold lined walls so that light from the source 2 is reflected along the walls of the sample cell toward the further end of the apparatus. Part of the radiation then passes through filter cell 6 while another part of the radiation passes through compensator cell 7. In all other respects, the apparatus is the same as that of Figure 1. The equivalent parts of the apparatus are identified by the same numerals as in Figure 1. One further distinction may be noted however, and that is that the radiation-measuring instruments generally employed in the apparatus of Figure 2 are not resistance thermometers but comprise a thermopile detector, each half of which is exposed to one beam of radiation.

Any type of differential temperature measuring device may be used with the apparatus of both Figures 1 and 2. In Fig. 1 differential resistance thermometers are used. Radiation of each of the beams falls upon each of the thermoresistance elements 8 and 9. These elements are contained in a conventional electrical bridge network consisting of the elements 18, 19, 20 and 21 as illustrated. The condition of electrical balance of this bridge is amplified and recorded by the amplifier 15 and the recorder 16. In Figure 2 each beam falls upon one half of a thermopile detector. The net differential thermal E. M. F. is amplified and recorded by amplifier 15 and recorder 16 employing techniques known to the art.

It is believed no further description of the details of the gas analyzers, represented in Figures 1 and 2 need be made, since they are of conventional construction.

In accordance with the present invention, a gas analyzing apparatus corresponding essentially to that shown in either Figures 1 or 2 is employed. In an especially desirable modification, the apparatus differs from the apparatus described in that a particular sample cell is employed. Referring to Figures 1 and 2, it will be noted that the sample cells 5, have a transparent face plate 22 exposed to the light source and have a parallel transparent plate 23 through which light may pass toward the radiation detectors. In the preferred modification the sample cell employed is not one in which the sides of the cell are parallel as stated but are sample cells in which the sides are non-parallel. The transparent faces of the novel cell are at an angle of about 15°. Suitable sample cells are represented in Figures 3 and 4. The sample cells may, if desired, be circular having the cylindrical body 25. At one end of the body and perpendicular to the body is placed a plate 26 which is transparent to infrared radiation. This plate may consist of silver chloride, or calcium fluoride for example. At the other end of the sample cell is placed a similar plate 27 which is so placed that it is not perpendicular to the cylindrical walls 25. The sample cell of Figure 4 is essentially the same as that of Figure 3 except that the non perpendicular plate 27 does not terminate the cylinder 25. The advantage of the construction of Figure 4 over that of Figure 3 is that it can conveniently be substituted in the conventional type of gas analyzer heretofore referred to in Figure 2. By placing gas tight gaskets, indicated by the numerals 28, at either end of the sample cell of Figure 4, it is possible to add this cell in the apparatus of Figure 2. If the apparatus is being especially constructed, the somewhat simpler cell of Figure 3 may be employed. It will be noted that the sample cells both have suitable inlets and outlets for passage into the cell and out of the cell of a gas composition to be analyzed. These passages are indicated by the numerals 29. In use, the novel sample cells of Fig. 3 or Fig. 4 are so placed in the apparatus of Figure 2 so as to permit rotation of the sample cell at will. A slightly different construction is required for the apparatus of Figure 1.

As described therefore, the novel gas analyzing apparatus of this invention comprises an infrared gas analyzer in which a sample cell is employed having non-parallel transmitting faces. The advantages of this construction will become apparent on understanding the analytical procedure which is to be followed in using the apparatus.

As stated, in accordance with the present invention, a novel procedure has been developed utilizing the apparatus described, making possible the identification of a single constituent in a gas sample containing several constituents opaque to infrared radiation. This procedure is to be conducted employing the apparatus disclosed, preferably employing the novel sample chambers shown in Figures 3 and 4.

In accordance with the preferred analytical procedure of this invention, a multi-constituent gas sample is passed through the sample cell 25 of Fig. 3 or 4 in the type of apparatus shown in Figures 1 and 2. Cell 25 is then rotated until a position is found at which each of the radiation detectors receives exactly the same quantity of radiation. Certain gases are then placed in the filter and compensator cells 6 and 7. The gases placed in these cells are so chosen as to make the instrument sensitive to the particular constituent it is desired to analyze. The light trimmers indicated by the numeral 11 on the drawings are then critically adjusted in such a way that the instrument will be selective to the particular constituent to be analyzed. The procedure necessary may thus be considered as comprising three steps. The first step is to critically adjust the rotational position of the sample cell 25. The second step is to suitably fill the filter and compensator cells with gases so as to sensitize the instrument to a particular key gas constituent. The third step of the procedure is then to adjust the light trimmers to a critical setting so as to make the apparatus selective for the particular gas constituent to be determined. Because of normal tolerances in the manufacture of the instrument, each of these steps of the analysis procedure are carried out by essentially a trial and error method. Suitable adjustments however, can only be achieved by carefully following the procedure to be hereafter disclosed. Each of the steps indicated will be described in detail.

Figure 5:
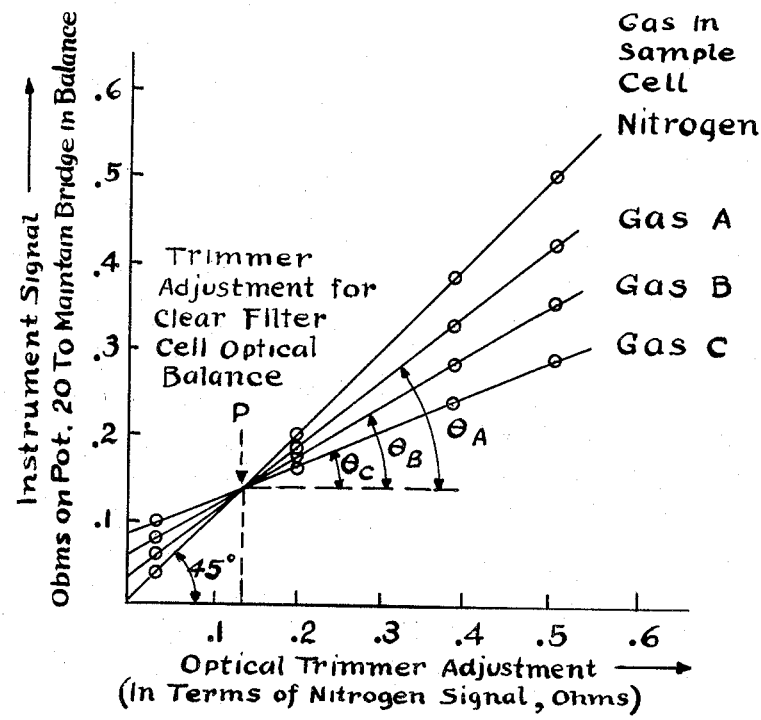

The first step of the analytical procedure, as stated, is the critical adjustment of the rotational position of the sample cell 25. This may be done while the filter and compensator cells are either empty or contain the same composition. The step is necessary in order to equalize the radiation path lengths through the sample cell. Even the best sources of infrared radiation tend to give off a non-symmetrical spatial distribution of radiation; that is, looking at the source from somewhat different directions, different intensities of radiation are received. Consequently, the length of the optical paths for the transmission of radiation reaching the detectors is not the same for each of the 2 beams. Thus if a conventional sample cell having parallel faces is employed, no precise clear cell optical balance point can be attained. By this is meant that no adjustment of the optical trimmers can be found where the difference in the amount of radiation reaching the two detectors is zero for all gases or mixtures of gases placed successively in the sample cell. This is indicated in Figure 5 which will be described in detail as the description proceeds. This effect can not be corrected by adjusting the light trimmers and furthermore, as will be seen, the trimmers are required to perform a different function. Therefore in accordance with this invention, the radiation path length intensity balance is obtained by rotating the sample cell 25. Due to the non-parallel structure of the cell windows the transmitting paths through the cell are of different lengths for the two radiation beams passing through the cells.

Rotation of the sample cell 25 will cause more or less path length to be added to one beam at the expense of the other beam. At each rotational position of sample cell 25 the sharpness of the clear cell balance point can be observed from a clear cell response pattern similar to that of Figure 5. The desired rotational adjustment of cell 25 is attained when no change in detector signal output is observed upon passing a variety of infrared opaque gases successively through the sample cell, as indicated by point P of Figure 5. It may be noted that without this critical adjustment of the radiation path lengths of the sample cell, accurate results are not easily obtained in a multi-constituent gas sample analysis.

In order to understand the procedure which is now employed it is necessary to appreciate the function and operation of the trimmers 10 and 11. Let it be assumed that both cells 6 and 7 are filled with nitrogen or some other gas transparent to infrared radiation. If nitrogen gas is also placed in the sample cell 5, therefore, the adjustment of either of the optical trimmers 10 or 11 will result in a change of the signal output recorded on the recorder 22. If, for example, the trimmer 10 is moved so as to cast more shadow on the compensator cell 7, then the total energy detected by detector 8 will be decreased. Consequently, there will be a change in the signal output of the detector bridge and a voltage difference will be recorded by recorder 22. The unbalance of the detector bridge may, of course, be brought back to a balanced condition by a corresponding adjustment of the trimmer 11 or by adjusting the bridge balancing potentiometer.

If now, in addition to nitrogen, various other gases which absorb infrared radiation are passed successively through the sample cell at atmospheric pressure, and measurements are made of the detector bridge signal for a variety of positions of the optical trimmer 10, the resulting data when plotted will resemble Figure 5. In Figure 5 the signals obtained for the different gases are plotted for each fixed trimmer position. The trimmer position is measured by the value of the nitrogen signal. Thus the line for nitrogen is at 45 degrees in Figure 5, while the lines for the other gases A, B and C, are at lesser angles.

The tangents of the angle of each line ($\tan \theta_A$, etc.) measure the fraction of the total radiation transmitted by the gas in the spectral region defined by the emitted spectrum of the source which is bounded and weighted in accordance with the transmission characteristics of the cell windows. The fraction of this radiation absorbed by the gas is $(1 - \tan \theta_A)$, $(1 - \tan \theta_B)$, etc. For example, the fraction of total radiation absorbed by certain gases as found with the aid of optical trimmers in combination with the instrument and method described above are listed in the following table:

| Gas at 1 Atmosphere, 128° F., 24 cm. cell | Fraction Absorbed from Radiation of Chromel Filament at 700° F. through calcium Fluoride Windows |
|---|---|
| Nitrogen | 0.00 |
| Carbon Dioxide | 0.10 |
| Methane | 0.23 |
| Ethane | 0.40 |
| Ethylene | 0.34 |
| Propane | 0.53 |
| Propylene | 0.60 |

Thus it is possible with the aid of the optical trimmers to make measurements of the relative opacities of individual gases and gas mixtures.

Returing to Figure 5, which is designated as a response pattern, it can be observed that the lines for the various gases A, B, C, and nitrogen all cross at the point P. This point P is called the "clear cell optical balance point" of the instrument. At the particular trimmer adjustment for the point P, each of the absorbing gases cause the instrument to respond with the same signal. Thus at this condition of the trimmers, the absorbing gases are indistinguishable from nitrogen as well as from one another. Further if the pressure of the absorbing gases is increased or reduced from one atmosphere, no change in signal occurs when the trimmers are set for the point P, provided the optical paths have been equalized by the proper rotational position of cell 25 as described.

Now in order to develop selective sensitivity of this instrument to a single gas X in the presence of other gases A, B, and C of a mixture, one of the cells 6 or 7, say cell 6, is filled with gas X, thereby sensitizing the instrument to gas X. Upon sensitizing the instrument to gas X, the resulting response pattern for relatively non-interfering gases is shown in Figure 6 as typical.

It will be found that the clear cell balance point has moved from point P to Q. A readjustment of the optical trimmers is now necessary in order to operate at the desirable point R as illustrated. At this point R, the gases A, B and C are indistinguishable from nitrogen as well as from one another and at the same point R an appreciable signal is obtained for gas X. Use of the optical trimmers for obtaining operation at the desirable point R in Figure 6 is a novel feature of this invention.

The desirable operating point R is found for each instrument and for each analysis through the use of the optical trimmers. The various gases contained in a mixture to be analyzed are passed individually through the sample cell of the sensitized instrument. This is done at different optical trimmer settings until one particular setting is found at which the instrument response to all gases in the mixture but the one desired are identical. This procedure is carried out by setting the trimmers in at least two different positions for each gas until a plot such as Figure 6 may be drawn. This will establish the trimmer setting which will correspond to point R. This trimmer setting is then retained for the desired analysis. Calibration for various proportions of gas X in gases A, B and C establishes a graduated scale of instrument signal against partial pressure or percentage of gas X in the mixture.

In cases where the gases of a mixture have similar absorption spectra, such as hydrocarbon gases of the same series, it is not possible to locate a point or region of minimum interference (point R, Figure 6) by adjustment of the optical trimmers alone. The response pattern for such a case resembles Figure 7. Here the instrument is sensitized to gas X by filling the filter cell 6 with gas X. In the response pattern of Figure 7 gases B and C give signals as if they were partially like gas X. No trimmer adjustment can be found where good selectivity to gas X exists. However, by placing a suitable proportion of gases B and C, under a suitable pressure in cell 7, the response patterns of Figure 7 may be altered or compensated to that of Figure 6. Use of the optical trimmers in the same manner as described is again necessary to locate and maintain the operating condition of the instrument at the point or region of minimum interference.

The procedure used to determine the gas composition to be included in the compensator cell 7 involves the following steps: First a pure constituent, other than X, of the mixture being analyzed is placed in cell 7. In general an infrared opaque gas of the mixture should be tried first. A response pattern is then obtained as described. The pressure of the gas in the cell 7 may also be varied while other response patterns are obtained. In the event these steps do not result in a non-interfering type of response pattern, it is necessary to repeat the procedure after adding another gas or gases to the cell 7. It is sometimes necessary to employ a gas not present in the gas mixture being analyzed. Saturated paraffin gases such as propane or butane have been used successfully. By following this procedure it is possible to find a gas composition to be placed in cell 7 which will change the response pattern from that of Figure 7 to that of Figure 6. In other words it is possible to determine a gas composition which when interposed in one of the beams of the apparatus will result in a non-interfering response pattern. The composition may consist of one or more gases but generally is characterized by containing a gas or gases which are relatively opaque to infrared radiation.

Figure 7:
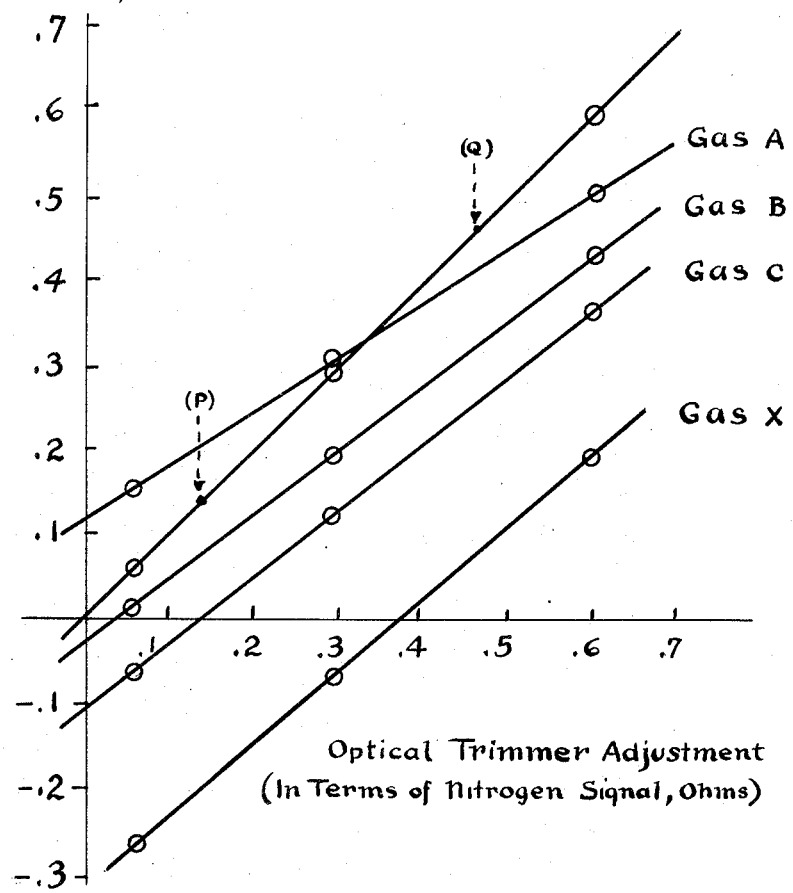

As described, in accordance with this invention the following preferred procedure is to be followed in employing the apparatus described. First the light reaching each of the radiation detectors is balanced for equal sample cell path length by rotating the sample cell 25. Secondly, with each constituent of a gaseous mixture, containing a gas X the percentage of which is to be obtained, a response pattern is obtained by varying the trimmers so as to obtain curves such as are shown in Figures 6 or 7. If the curves are that of Figure 6, by maintaining the trimmer settings indicated by line R, the apparatus may then be calibrated for different percentages of X and the analysis may then be conducted. If the curves such as shown by Figure 7 result, it is necessary to find a proper gas composition for cell 7 to convert Figure 7 to that of Figure 6. This is done by the procedure described. As stated, it will be found that gas compositions will result in curves of the nature of Fig. 6, without necessity for employing a particular gas composition in cell 7, only if not more than one constituent of the gas mixture is opaque to infrared radiation or if the gases are mutually non interfering. In all other cases it is necessary to find and use the proper gas composition for cell 7. This is the case for example, in all analyses of gases containing more than one hydrocarbon.

In order to facilitate the adjustments for the maximum selective analytical properties of the instruments described in the above procedure, an interference cell may be used across both beams as shown in Figure 2 as cell 30. By placing interfering gases such as B and C in Figure 7 in the interference cell 30, their interfering effect can be reduced. With a reduced interfering effect the procedure for developing the maximum selectivity is easier to apply.

One further aid which has been found useful in conjunction with the procedure above in obtaining the desired selectivity for key components of a mixed gaseous stream is in the adjustment of the sample cell length in proportion to the length of the other cells. In general it is found that using as short a sample cell as possible will increase the calibration linearity and selectivity of the instrument. The limiting factor of course is the sensitivity of the detector-amplifier-recorder system. In addition, use of a long interference cell will in general reduce the available signal but increase the overall selectivity.

Having now fully described the apparatus and method of this invention, its scope and application will be better understood by reference to the following examples.

*Example I.*—In the polymerization stage of a butyl rubber plant, normal butenes likely to be present in the isobutylene feedstock do not react, but tend to accumulate in the system. As they accumulate it is believed that they affect the conversion rate of isobutylene. Since this conversion rate is correlated with the quality of the final rubber product it is desirable to be able to control the normal butenes concentration level in the polymerization stage. Normally this is done by adjustment of the purge rate of the spent isobutylene stream on the basis of laboratory distillation or spectroscopic analysis for normal butenes in the spent isobutylene stream. Since these laboratory analyses require 4 to 6 hours to be performed, the control of the isobutylene purge rate lags behind the actual conditions by at least this amount. With a normal butenes recorder built and used in accordance with this invention, determination of the normal butenes content is obtained continuously with a lag of only several minutes. With the use of this instrument, the isobutylene purge rate can be adjusted to maintain a more nearly constant normal butenes concentration level in the process with the desirable result of maintaining more uniform quality of the resulting rubber product.

The spent isobutylene stream in which it is desired to record the total normal butenes content has the following typical composition:

| Component | Range in Composition (Normal Operation) |
| --- | --- |
| Isobutylene | 85–98 mol. percent. |
| Isobutane | 1–3. |
| Normal Butane | Trace (less than 0.4%). |
| Butene-1 | 1–10 } To be recorded. |
| Cis-Butene-2 | 0–2 |
| Butadiene | Trace (less than 0.4%). |
| Isoprene | 0. |
| Methyl Chloride | 0. |
| Nitrogen | 0. |

The presence of isoprene and methyl chloride may also occur.

It is desired to record the total percentage of normal butenes (butene-1 and cis-butene-2) in this stream with the instrument formerly described. In order to obtain (a) equal sensitivity to butene-1 and cis-butene-2 so that the instrument will record the sum of their partial pressures or group percentage and (b) insensitivity to the presence of or to varying proportions of the other stream components including nitrogen, isoprene, methyl chloride, butadiene and normal and isobutane, the following mixtures determined according to the procedure described, are employed as selective absorbers in the cells 6 and 7 of the instruments of Figures 1 or 2.

Parts by gaseous volume

Cell 6—3 cm. in length
    silver chloride windows:
        Isobutylene _____ 27
        Normal butane _____ 10
        Isoprene _____ 6

Cell 7—3 cm. in length
    silver chloride windows:
        Butene-1 _____ 1
        Cis-butene-2 _____ 1

Figure 8:
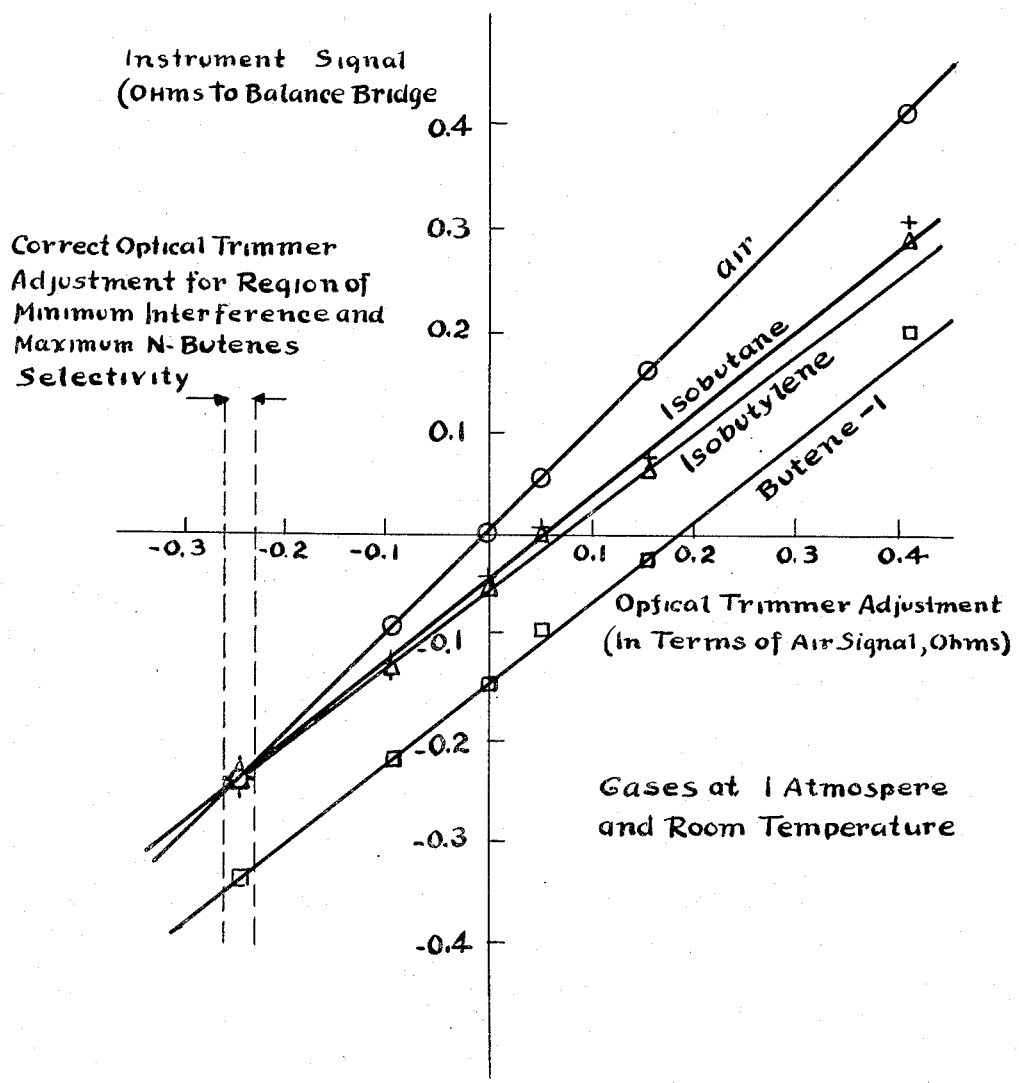

While the above proportions are preferred, the proportions of each component may be varied within the range of ±50%. To sensitize the instrument with these mixtures cell 6 is filled with its mixture to attain an absolute pressure of 700 mm. of mercury. Cell 7 is filled with its mixture to attain an absolute pressure of approximately 350 mm. of mercury. The pressure of filter cell 7 is adjusted until the instrument response for isobutylene and isobutane is indistinguishable when these compounds are passed successively through the sample cell. A suitable pressure is about 350 mm. of mercury. The purpose of these adjustments is to obtain an operating region of minimum interference as described and as shown in Figure 8 by data taken from an actual analysis. Having obtained the proper operating condition, as shown by the vertical dashed lines, with the aid of the optical trimmers and with the specific mixtures for use as differential absorbers, the instrument is now calibrated by passing various blends of normal butenes in isobutylene through the sample cell. The instrument is then ready to record continuously the normal butenes content of the spent isobutylene stream in a butyl rubber plant.

*Example II.*—In connection with the production of ethanol from petroleum plant operation, a residue hydrocarbon gas stream after acid absorption and caustic scrubbing has the following typical composition: hydrogen 17.5 mol percent, methane 59.7%, ethane 17.6%, ethylene 5%, carbon monoxide 0.1% max., carbon dioxide 0.05% max., sulphur dioxide 0.05% max. This residue stream is often burned with consequent wastage of ethylene, useful in the process of manufacturing ethanol. Since the recovery of the residual ethylene in this stream requires the use of a more extensive acid treat, there is a certain concentration of ethylene in the above stream which constitutes a minimum overall economic loss. Present laboratory methods of determining the ethylene concentration in this stream require 5 to 6 hours to perform. Because of this time delay in the analysis, plant operation to maintain the desired ethylene level in the residue gas stream is uncertain. An ethylene recorder involving a delay of only several minutes if placed in this residue stream aids in maintaining the operation of the ethylene recovery process at the most economical point. Increased overall efficiency of the ethanol plant may result.

Figure 9:
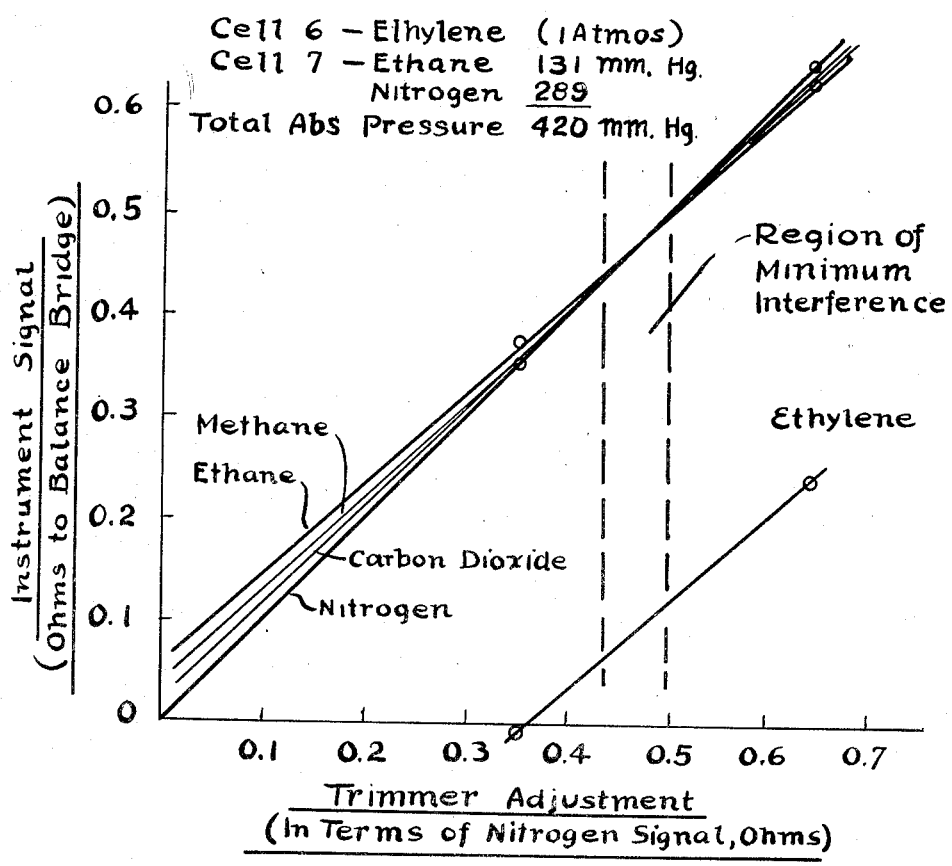

In accordance with this invention the following compositions are determined and are placed in cells 6 and 7 of the apparatus described:

Cell 6—3 cm. in length silver chloride windows:
    Ethane: 131 mm. Hg absolute
    Nitrogen: 289 mm. Hg absolute
    Total: 440 mm. Hg absolute and in Cell 7—3 cm. in length silver chloride windows:
    Ethylene: 1 atmosphere With these two gas compositions in the cells, the optical trimmers are adjusted so that the gases other than ethylene are indistinguishable when passed successively through the sample cell. In the response pattern shown in Figure 9 the region of minimum interference is marked. The trimmer adjustment which allows operation in this region is the desired operating condition. The next step is to calibrate the device over the desired range of concentration or partial pressure of ethylene by using known blends of ethylene in the other stream components. The instrument is then ready for plant use as an ethylene recorder.

While the pressures shown above for the gases in the filter cells are preferred, the pressure of each gas in the filter cells may be varied between $1/100$ and 10 atmospheres. In addition nitrogen need not be present in either of the filter cells.

*Example III.*—In fluid catalytic cracking of petroleum, the regeneration of the finely divided catalyst is a necessary part of the continuous process. This consists in burning carbon formed on the catalyst particles to carbon monoxide and carbon dioxide. Most efficient utilization of the oxygen in the air used and the least evolution of heat, both of which are desirable, will occur with the highest carbon monoxide formation. The regeneration is conducted by passing air through a fluidized bed of the spent catalyst. After the regeneration gas has passed through the dense fluidized bed of catalyst and into a less dense dispersed phase, carbon monoxide and oxygen present may undergo what is called "afterburning." High carbon monoxide concentration and high temperatures are conducive to afterburning, yet both should be maintained at high levels since they are limiting factors in plant capacity. When the phenomenon of after-burning of carbon monoxide to dioxide occurs, the catalyst particles disintegrate producing a large amount of fines, catalyst is deactivated by excessively high temperature and equipment is damaged. The analytical procedure and method of the present invention are particularly useful in controlling these factors. To accomplish this it is necessary to critically control the carbon monoxide content of the regenerator gas stream.

A typical composition for the regenerator gas stream, in which higher hydrocarbons may also be present, is as follows:

| Constituent | Average, Percent (Mol) | Normal Range, Percent (Mol) | Extreme, Percent (Mol) |
| --- | --- | --- | --- |
| Carbon Monoxide | 8.3 | 7.5–9.5 | 4.0 |
| Carbon Dioxide+Sulphur Dioxide | 9.1 | 8.0–9.5 | 13.0 |
| Oxygen | 2.1 | 1.0–3.0 | 0.0 |
| Nitrogen | 80.2 | Difference | Difference |
| Methane | 0.0 | 0–1.0 | 0–1.0 |
| Hydrogen | 0.3 | 0–1.5 | 0–1.0 |

A carbon monoxide indicator-recorder for this stream must be insensitive to all components except carbon monoxide in whatever proportions they may be present as shown in the above table. In addition, the presence of higher hydrocarbons such as ethane, propane, butane, etc. must not affect the reading of the carbon monoxide recorder-indicator.

Figure 10:
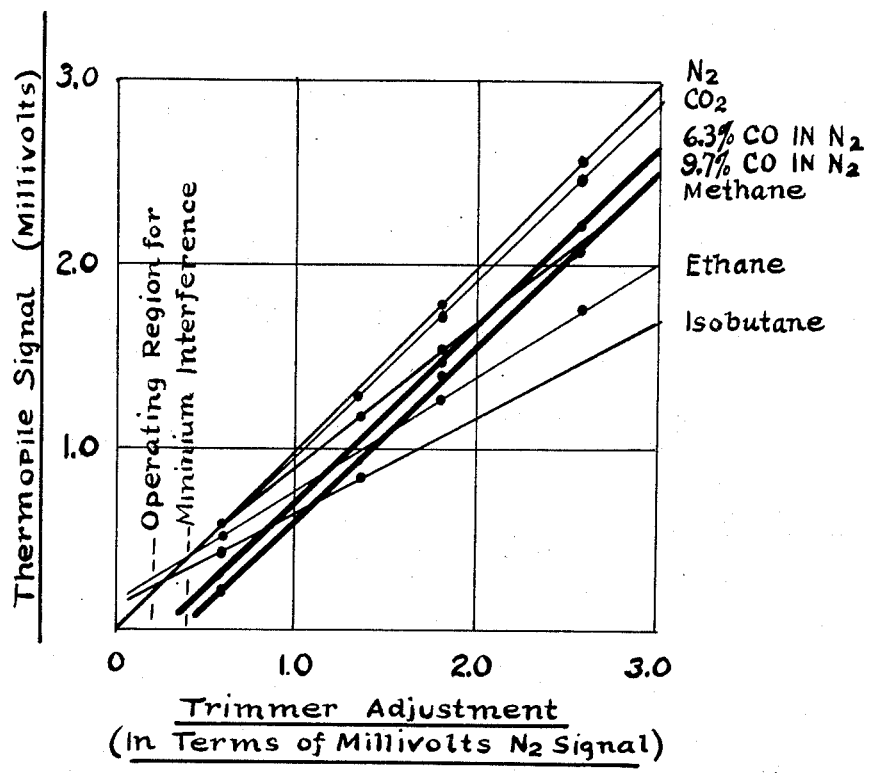

Sensitization of the instrument of this invention is accomplished by placing 1 atmosphere of carbon monoxide in cell 6 in one of the two radiation beams, and 1 atmosphere of carbon dioxide in the interference cell 30. The necessary trimmer setting for operation at the region of minimum interference is shown in the accompanying Figure 10.

The instrument is then calibrated with blends of carbon monoxide in nitrogen to cover the desired range (4.5–10%). Use of the optical trimmers as described in developing maximum selectivity to carbon monoxide is essential.

The percentage of carbon monoxide in the flue gas from the regenerator is now used, in conjunction with oxygen and temperature measurements, to effect a better control of carbon burning rates, to prevent afterburning, and to improve the heat balance in starting up and shutting down the fluid catalytic cracking unit.

To briefly recapitulate, the present invention relates to a novel dual beam infrared analytical procedure. The procedure is of particular application to the analysis of hydrocarbon gas mixtures. A preferred, although optional step, is to vary the radiation path length of the two beams to obtain identical path length-intensity balance for the two beams. A second step is to place a cell containing the key component of the mixture being analyzed in one of the beams of radiation. Each component of the mixture is then placed in a sample cell in the path of both beams while the intensity balance of the beams are altered by variation of the trimmers of the apparatus. This procedure will indicate the intensity unbalance as provided by particular trimmer settings which will provide the most selective conditions of operation. A further step, generally required when the mixture being analyzed contains more than one infrared opaque gas, is to place a third cell containing a particular gas composition in the beam which does not pass through the key component cell. If desired a fourth cell positioned in each beam may be employed, the cell being filled with gases in the mixture being analyzed which are opaque to infrared radiation. As shown by the example given, this analytical procedure enables the selective identification of a gas component of a gas mixture.

Having now fully disclosed the nature of this invention, what is claimed is:

1. An arrangement for the determination of a constituent in a mixture comprising in combination at least two radiation detectors, a source of radiation adapted to irradiate said detectors, a first body containing the mixture to be tested and located in the range of rays between the said source and the said detectors, said first body being characterized by non-parallel surfaces facing the said source of radiation and the said detectors, a second body containing the constituent to be determined and inserted in the range of rays between the said source and one of said detectors, a third body containing a selectively radiation absorbent composition and inserted in the range of rays between the said source and the other of said detectors, and means for measuring the difference of irradiation of the said detectors.

2. The arrangement defined by claim 1 wherein the said non-parallel surfaces are at an angle of about 15 degrees.

3. A process for determining a constituent of a mixture comprising the steps of passing two beams of radiation through said mixture and impinging said beams on radiation detectors, equalizing the radiation path length of said two beams through the mixture whereby the energy of said beams impinging on said detectors is substantially balanced, positioning a transparent cell containing the said constituent in one of said beams, placing a second transparent cell containing a second constituent partially opaque to the radiation in the other of said beams, and unbalancing the radiation intensities of said beams by critical positioning of light trimmers in said beams so as to permit selective determination of the said constituent.

4. The process defined by claim 3, wherein each of said beams of radiation is passed through a third transparent cell containing at least one of the constituents of said mixture.

5. A process for determining a specified constituent of a mixture comprising the steps of passing two beams of radiation of substantially balanced energy along separate paths from a source and impinging the beams on radiation detectors, positioning said mixture in a transparent cell in the paths of both beams, positioning the specified constituent in a different transparent cell in the path of one of said beams, positioning a second constituent partially opaque to the radiation in another transparent cell in the path of the other of said beams, and unbalancing the radiation intensities of said beams by critical positioning of light trimmers in said beams so as to permit selective determination of the specified constituent.

References Cited in the file of this patent

UNITED STATES PATENTS

| Number | Name | Date |
|---|---|---|
| 585,694 | Orford | July 6, 1897 |
| 1,758,088 | Schmick | May 13, 1930 |
| 2,386,831 | Wright | Oct. 16, 1945 |
| 2,431,019 | Barnes | Nov. 18, 1947 |
| 2,443,427 | Kidder et al. | June 15, 1948 |
| 2,452,122 | Gumaer | Oct. 26, 1948 |
| 2,462,995 | Ritzmann | Mar. 1, 1949 |
| 2,518,307 | Groebe | Aug. 8, 1950 |

OTHER REFERENCES

Recording Infra-Red Analyzers for Butadiene and Styrene Plant Streams by N. Wright et al., Journal of the Optical Society of America, April 1946, pages 195–202.

Selective Infra-Red Gas Analyzers by W. G. Fastie et al., Journal of the Optical Society of America, October 1947, pp. 762–768.

The Optical-Acoustic Method of Gas Analysis by F. I. Callison, Nature, February 1, 1947, p. 167.